(12) United States Patent
Zakhor et al.

(10) Patent No.: US 12,361,713 B2
(45) Date of Patent: Jul. 15, 2025

(54) METHODS AND SYSTEMS FOR DETERMINING BUILDING INTERNAL FRAMEWORK FROM EXTERNAL IMAGERY

(71) Applicant: Signetron Inc., Berkeley, CA (US)

(72) Inventors: Avideh Zakhor, Berkeley, CA (US); Zixian Zang, Berkeley, CA (US)

(73) Assignee: Signetron Inc., Berkeley, CA (US)

( * ) Notice: Subject to any disclaimer, the term of this patent is extended or adjusted under 35 U.S.C. 154(b) by 423 days.

(21) Appl. No.: 17/871,536

(22) Filed: Jul. 22, 2022

(65) Prior Publication Data

US 2024/0029438 A1 Jan. 25, 2024

(51) Int. Cl.
*G06V 20/50* (2022.01)
*G06T 5/00* (2024.01)
(Continued)

(52) U.S. Cl.
CPC ............... *G06V 20/50* (2022.01); *G06T 5/00* (2013.01); *G06T 5/50* (2013.01); *G06T 7/11* (2017.01); *G06T 7/62* (2017.01); *G06T 2200/24* (2013.01); *G06T 2207/10024* (2013.01); *G06T 2207/10048* (2013.01); *G06T 2207/20132* (2013.01); *G06T 2207/30184* (2013.01)

(58) Field of Classification Search
CPC . G06T 2207/10024; G06T 2207/10048; G06T 2207/30184; G06T 2210/04; G06T 5/00–94; G06T 2207/20132; G06T 2207/20212–24; G06T 11/003–008; G06T 2207/20068; G06T 2215/08; G06T 3/08; G06V 10/143; G06V 20/176; G06V 20/50–52; G06V 10/16; G06V 10/24–248
See application file for complete search history.

(56) References Cited

U.S. PATENT DOCUMENTS

2023/0108409 A1* 4/2023 Deliwala ............... G01J 3/2823
382/128
2023/0204424 A1* 6/2023 Ranganathan ......... G06V 20/17
348/144

OTHER PUBLICATIONS

Roy et al., A learning-based framework for generating 3D building models from 2D images (Year: 2022).*
(Continued)

*Primary Examiner* — Ross Varndell
(74) *Attorney, Agent, or Firm* — KALI LAW GROUP, P. C.

(57) ABSTRACT

Methods for defining a building internal framework from external imagery are presented, the method including: receiving a number of raw images of a building; processing the number of raw images of the building to establish a number of facades; and determining the building internal framework for each of the number of facades. In some embodiments, the processing the number of raw images includes: for each of the number of façades, selecting a façade; selecting all IR thermography images corresponding with the selected façade; removing distortion from the selected IR thermography images; stitching the selected IR thermography images corresponding with the selected façade together to form a single façade image corresponding with the selected facade; correcting perspective distortion of the single facade image; cropping the single façade image; and receiving dimensions of an actual façade corresponding with the single façade image.

14 Claims, 10 Drawing Sheets

(51) Int. Cl.
    *G06T 5/50*     (2006.01)
    *G06T 7/11*     (2017.01)
    *G06T 7/62*     (2017.01)

(56) References Cited

OTHER PUBLICATIONS

Chen et al., Development of panoramic infrared images for surface temperature analysis of buildings and infrastructures (Year: 2020).*
Xu et al., Geo-registering UAV-captured close-range images to GIS-based spatial model for building faÃ§ade inspections (Year: 2020).*
Alibaba et al., A building elements selection system for architects (Year: 2004).*

* cited by examiner $K_2 = 11$ $K_2 = 6$ $K_2 = 1$

METHODS AND SYSTEMS FOR DETERMINING BUILDING INTERNAL FRAMEWORK FROM EXTERNAL IMAGERY

BACKGROUND

In retrofitting or remodeling of many buildings, it is necessary to know the location of the building's internal framework. A building's internal framework can include studs, beams, posts, and any other support structure of the building. These structures are not typically visible from the exterior of the building nor are the structure's locations always intuitively obvious. Knowing the locations of these structures is critical to anchoring objects to the building. For example, every time additional panels or objects are hung from the existing buildings, they require anchor points which need to be tied to studs, posts, or beams. Conventional framework detection instruments and methods can only be used inside the building. Existing approaches for determining framework location on the exterior is to translate interior measurements to the exterior using structures that are visible from both the interior and the exterior locations as, for example, windows. As such these methods are error prone and inaccurate.

As such, methods and systems for determining building internal framework from external imagery are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for defining a building internal framework from external imagery are presented, the method including: receiving a number of raw images of a building; processing the number of raw images of the building to establish a number of facades; and determining the building internal framework for each of the number of facades. In some embodiments, the number of raw images includes: a number of infrared (IR) thermography images; and a number of red-green-blue (RGB) images. In some embodiments, the processing the number of raw images includes: for each of the number of façades, selecting a façade; selecting all IR thermography images corresponding with the selected façade; removing distortion from the selected IR thermography images; stitching the selected IR thermography images corresponding with the selected façade together to form a single façade image corresponding with the selected facade; correcting perspective distortion of the single facade image; cropping the single façade image; and receiving dimensions of an actual façade corresponding with the single façade image. In some embodiments, the cropping the single façade image further includes: cropping the single facade image in conformity with a corresponding RGB image of the actual façade. In some embodiments, the stitching the selected IR thermography images includes: applying projective transformations to stitch pairs of the selected IR thermography images together one at a time. In some embodiments, the determining the building internal framework for each of the number of facades includes: receiving the single façade image; identifying the building internal framework shown in the single façade image; and determining the building internal framework dimensions shown in the single façade images. In some embodiments, the building internal framework is selected from the group consisting of: wood studs, wood beams, wood posts, metal studs, metal beams, metal posts, engineered studs, engineered beams, and engineered posts. In some embodiments, the external imagery is captured by aerial photographic equipment or ground level photographic equipment.

In other embodiments, systems for defining a building internal framework from external imagery are presented, the system including: an image capture device for capturing a number of raw images of a building; a computing processor capable of processing the number of raw images of the building to establish a number of facades; and a user interface for determining the building internal framework for each of the number of facades. In some embodiments, the number of raw images includes: a number of infrared (IR) thermography images; and a number of red-green-blue (RGB) images. In some embodiments, the processing the number of raw images includes: for each of the number of façades, selecting a façade; selecting all IR thermography images corresponding with the selected façade; removing distortion from the selected IR thermography images; stitching the selected IR thermography images corresponding with the selected façade together to form a single façade image corresponding with the selected facade; correcting perspective distortion of the single facade image; cropping the single façade image; and receiving dimensions of an actual façade corresponding with the single façade image.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
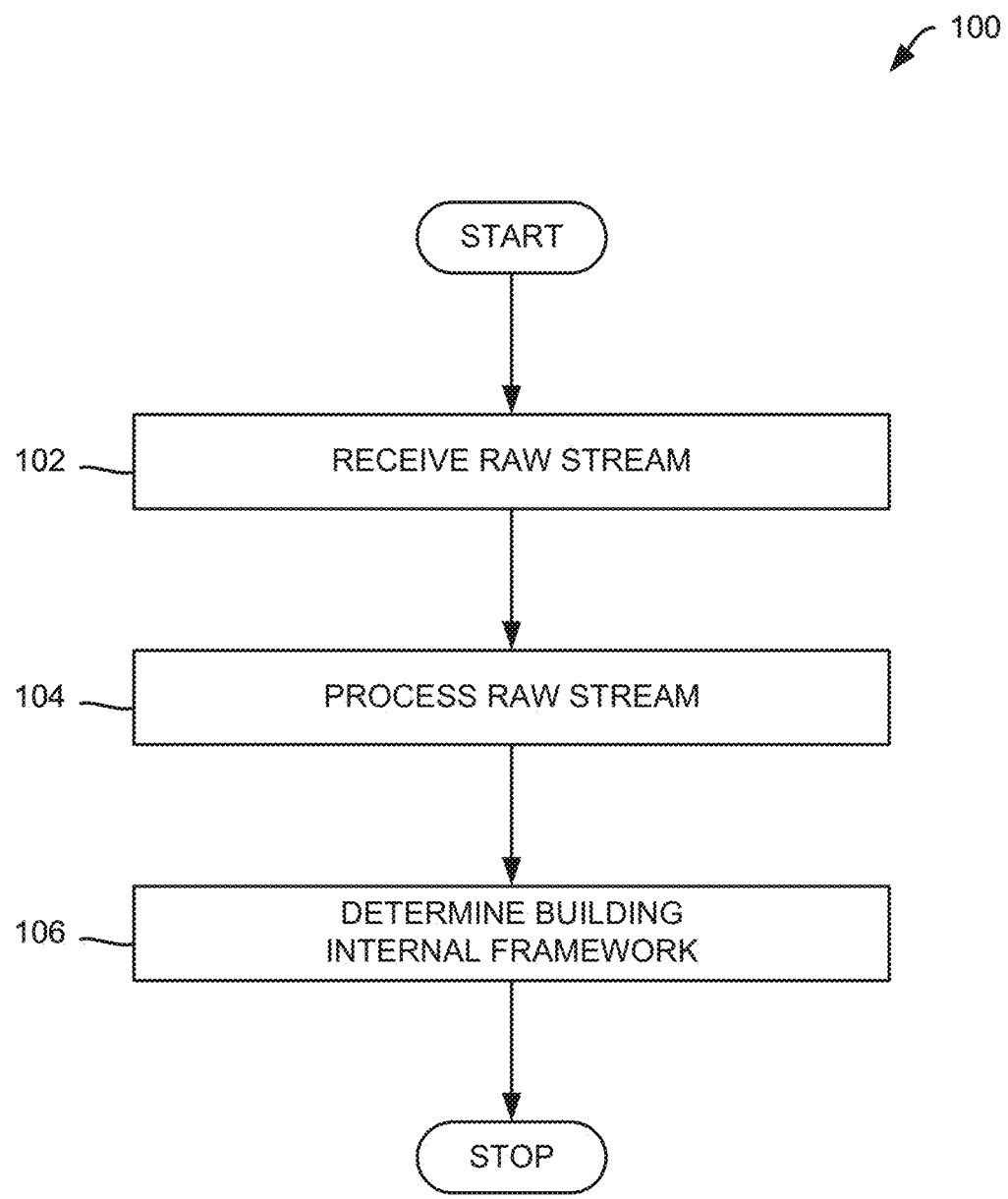
FIG. 1 is an illustrative flowchart of methods for defining building internal framework from external imagery in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

FIG. 1 is an illustrative flowchart of methods 100 for defining building internal framework from external imagery in accordance with embodiments of the present invention. At a first step 102, the method receives raw streams of images. Receiving raw streams will be discussed in further detail below for FIG. 2. At a next step 104, the method continues to process the raw stream to establish the facades of a building. Processing the raw stream will be discussed in further detail below for FIG. 2. At a next step 106, the method determines a building's internal framework. Determining the building's internal framework will be discussed in further detail below for FIG. 3.

Figure 2:
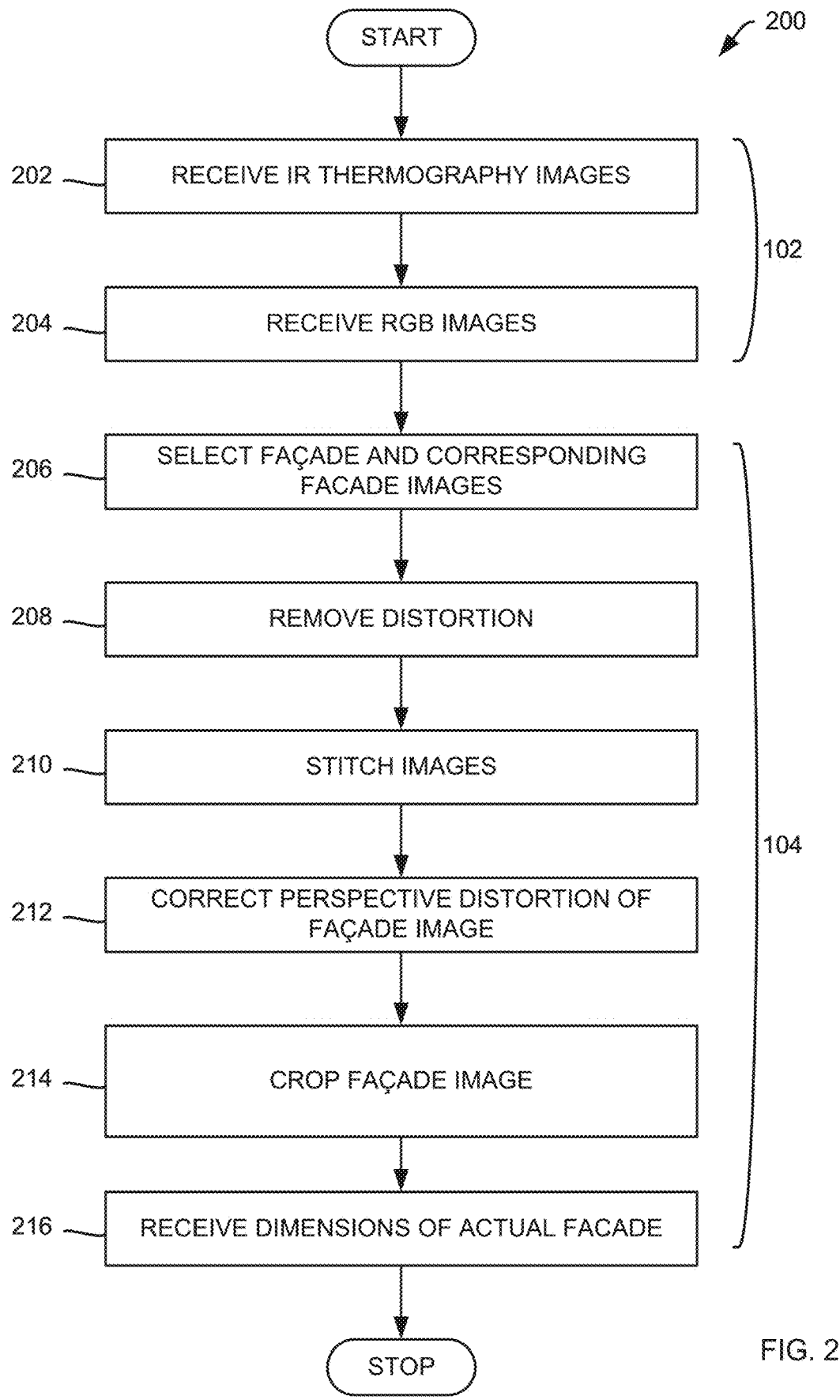
FIG. 2 is an illustrative flowchart of methods for processing image streams in accordance with embodiments of the present invention.
Figure 3:
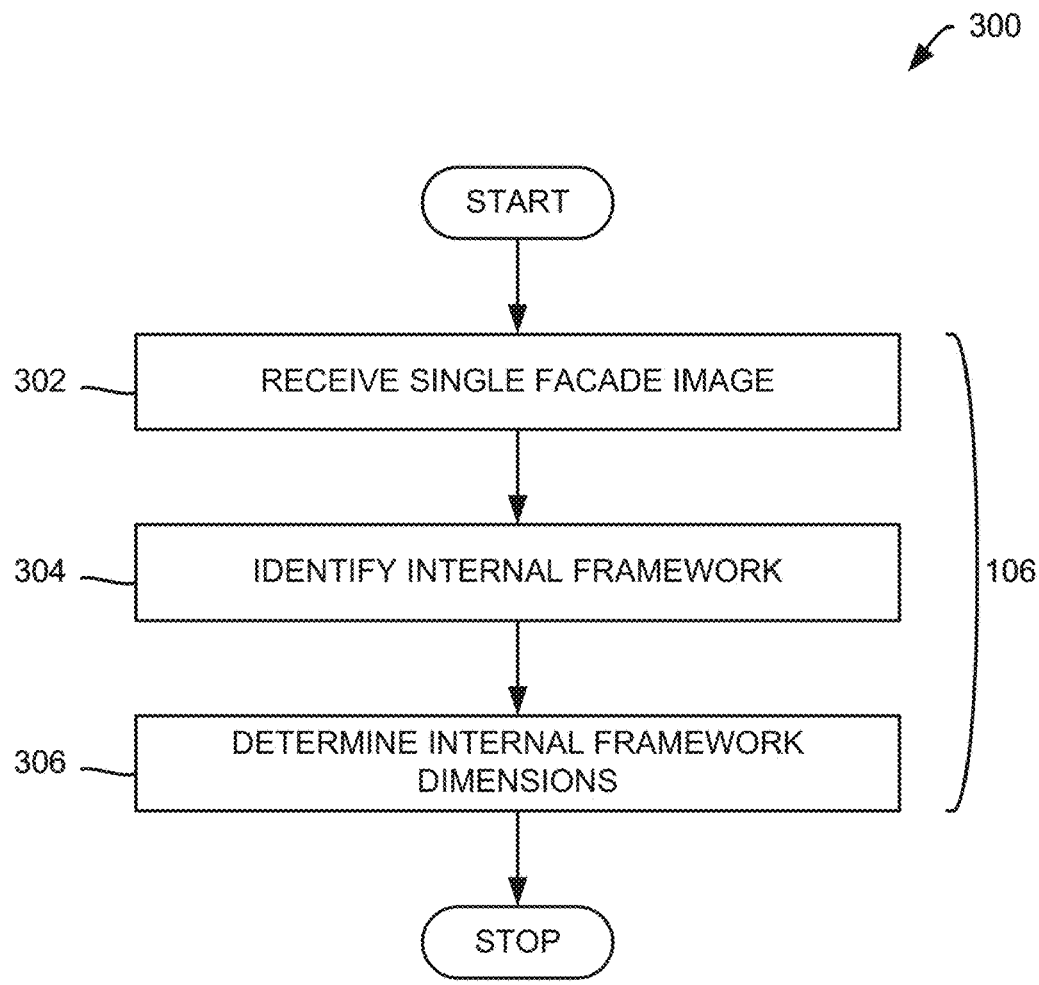
FIG. 3 is an illustrative flowchart of methods for determining building internal framework in accordance with embodiments of the present invention.

FIG. 2 is an illustrative flowchart of methods 200 for processing image streams in accordance with embodiments of the present invention. As illustrated, steps 202 and 204 further describe step 102 (see FIG. 1) above. As such, at a step 202, the method receives IR thermography images. As noted above, raw (or unprocessed) streams are typically captured by having a human operator use a thermal camera to simultaneously capture IR thermography images and visually detect anomalies real time as s/he walks around the perimeter of the building. As such, raw streams include any number of raw IR thermography images of a building's exterior. These raw IR thermography images may, in embodiments, be captured by aerial photographic equipment or ground level photographic equipment that are configured to capture IR thermography images. In addition, aerial photographic equipment embodiments may include any known aerial equipment known in the art without limitation. For example, photographic equipment utilizing manned or unmanned drones, airplanes, helicopters and other aerial vehicles may be utilized to capture images. In some embodiments, images may be captured from multiple sources such as multiple drone captures or combinations of aerial and ground level photographic equipment. Likewise, ground level photographic equipment embodiments may include any known ground level equipment known in the art without limitation. For example, photographic equipment utilizing manned or unmanned robots may be utilized to capture images. In some embodiments, images may be captured from multiple sources such as multiple robotic captures or combinations of aerial and ground level photographic equipment.

At a next step 204, the method receives RGB images. As above, raw streams are typically captured by having a human operator use a camera to capture RGB images. As such, raw streams include any number of raw RGB images of a building's exterior. These raw RGB images may, in embodiments, be captured by aerial photographic equipment or ground level photographic equipment that are configured to capture RGB images. In addition, aerial photographic equipment embodiments may include any known aerial equipment known in the art without limitation. For example, photographic equipment utilizing manned or unmanned drones, airplanes, helicopters and other aerial vehicles may be utilized to capture images. In some embodiments, images may be captured from multiple sources such as multiple drone captures or combinations of aerial and ground level photographic equipment. Likewise, ground level photographic equipment embodiments may include any known ground level equipment known in the art without limitation. For example, photographic equipment utilizing manned or unmanned robots may be utilized to capture images. In some embodiments, images may be captured from multiple sources such as multiple robotic captures or combinations of aerial and ground level photographic equipment.

Figure 4:
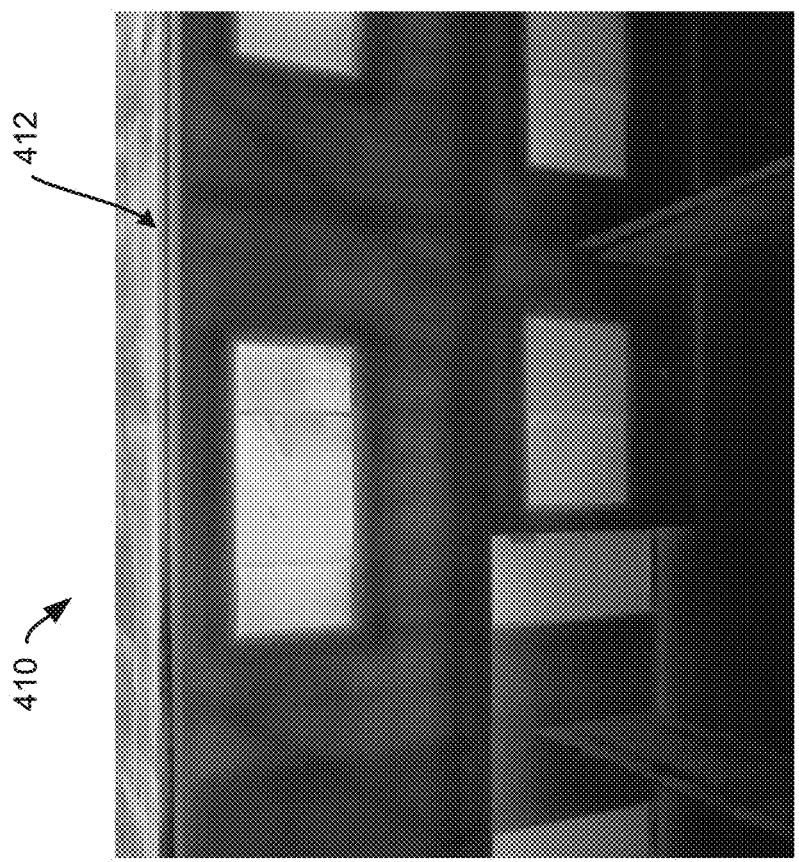
FIG. 4 are illustrative representations of IR thermography images showing distortion and corrected distortion in accordance with embodiments of the present invention.
Figure 4:
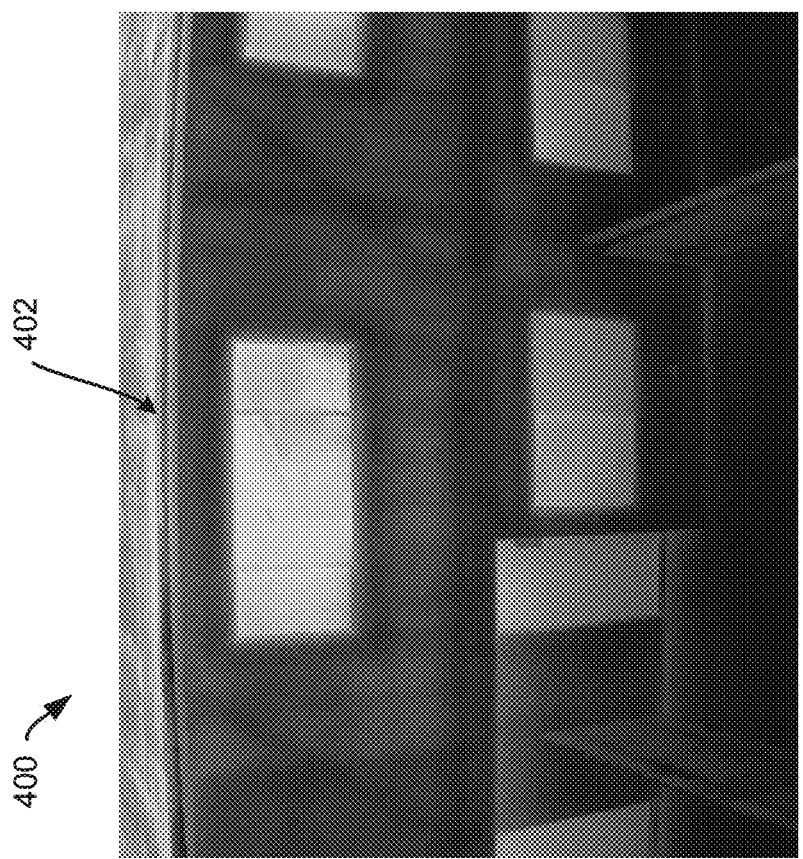

Further illustrated are steps 206 to 216 that further describe step 104 (see FIG. 1) above. As such, at a step 206, the method selects a façade and its corresponding facade images. A façade, a contemplated herein is defined as a single face of a building. For example, in aerial photography embodiments, images of a building may be captured from many different angles and elevations. As such, each façade of a building may be captured in many images from many different angles and elevations. At this step then, the method selects all IR thermography images corresponding with a selected façade of a building under examination. In order to select the IR thermography images, the method utilizes meta data attached to each image. The attached meta data includes global positioning system (GPS) data of the image capture device location and the pose of the image capture device. With this information, all images corresponding with a selected façade may be found. At a next step 208, distortion is removed from the selected IR thermography images. Because of radial distortion, captured images initially do not guarantee that points located on a straight line in real world will also be in a straight line on the images, so cannot be used directly to create a panorama. In the case of an IR thermography camera, image magnification decreases with distance from the optical axis, resulting in a barrel distortion. An example of distortion is provided in FIG. 4 which is an illustrative representation of IR thermography image 400 showing distortion 402 in accordance with embodiments of the present invention.

Figure 5:
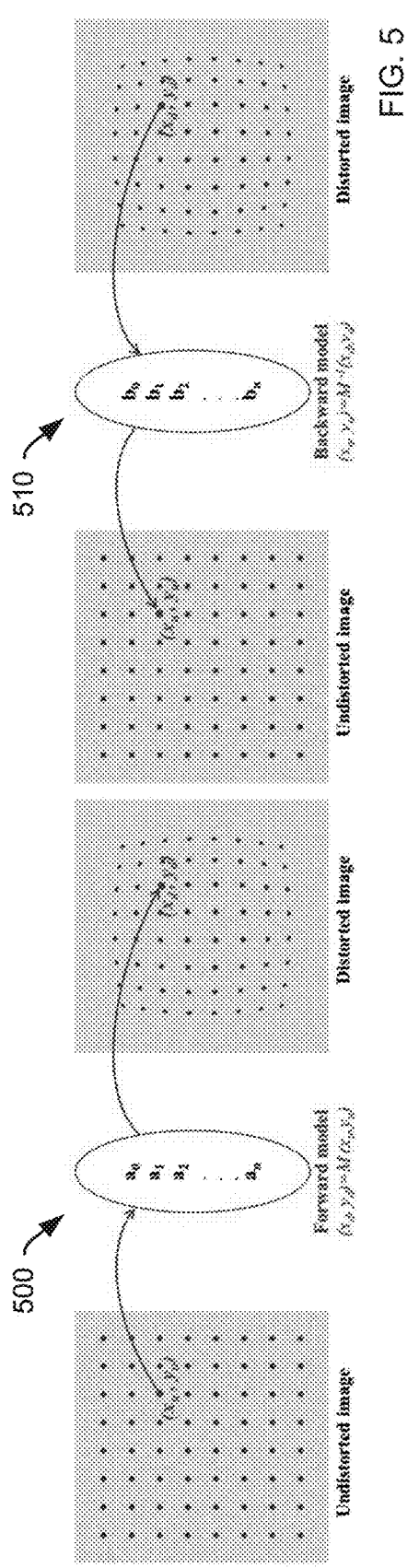
FIG. 5 are illustrative representations of forward and backward mapping processes in accordance with embodiments of the present invention.

In general, to correct radial and/or perspective distortion, a model to map between the distorted space/plane and the undistorted space/plane is required. Mapping from an undistorted space to a distorted space is known as forward mapping as shown in FIG. 5, which includes illustrative representations of forward mapping process 500 and backward or inverse mapping process 510 in accordance with embodiments of the present invention. In embodiments provided herein, parameters are calculated for determining a backward or inverse mapping model in order to perform calibration on thermal images according to the Brown-Conrady distortion model.

$$x_u = x_d + (x_d - x_c)(K_1 r^2 + K_2 r^4 + \dots) + (P_1(r^2 + 2(x_d - x_c)^2) + 2P_2(x_d - x_c)(y_d - y_c))(1 + P_3 r^2 + P_4 r^4 \dots)$$

$$y_u = y_d + (y_d - y_c)(K_1 r^2 + K_2 r^4 + \dots) + (2P_1(x_d - x_c)(y_d - y_c) + P_2(r^2 + 2(y_d - y_c)^2))(1 + P_3 r^2 + P_4 r^4 \dots)$$

Equation 1

Where, ($x_d$, $y_d$) is the distorted image point as projected on image plane using specified lens, ($x_u$, $y_u$) is the undistorted image point as projected by an ideal pinhole camera, ($x_c$, $y_c$) is the distortion center, $K_n$ is the $n^{th}$ q radial distortion coefficient, $P_n$ is the $n^{th}$ tangential distortion coefficient, and $r = ((x_d - x_c)^2 + (y_d - y_c)^2)^{1/2}$ is the Euclidean distance between the distorted image point and the distortion center.

Figure 6:
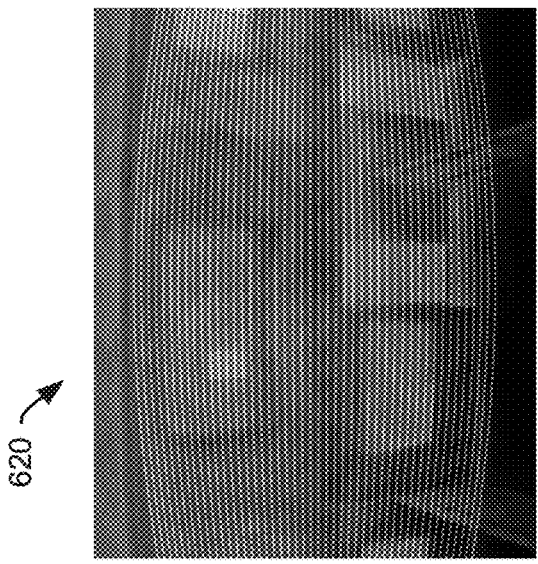
FIG. 6 is an illustrative representation of line-pattern visualization for different values of $K_2$ in accordance with embodiments of the present invention.
Figure 6:
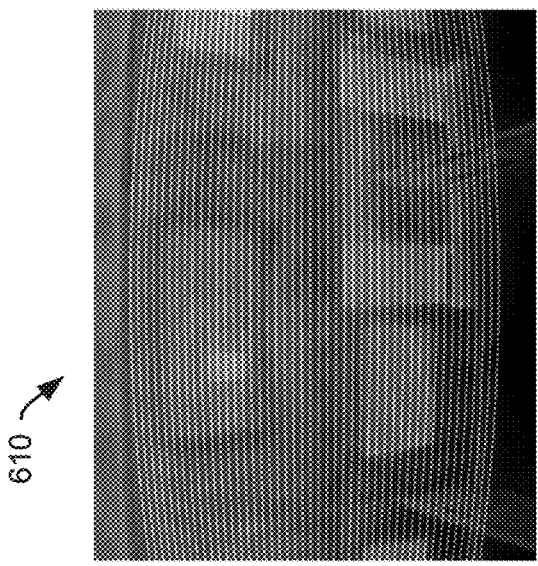
Figure 6:
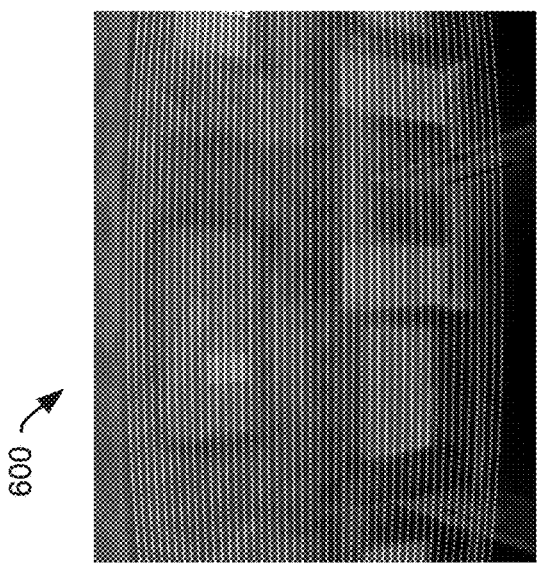

In embodiments tangential distortion is ignored since the lens and the image plane are parallel. The approach is to create a line-pattern for visual inspection and apply an estimated forward model to the line-pattern and overlay the result on top of the image in order to find the appropriate parameters for the forward model. This is accomplished by adjusting parameters of a forward model, applying to the line-pattern, overlaying to the distorted image, and making sure the warped lines are matching with the curve feature in the image. Values for $K_2$, $K_3$, and $K_4$ are tuned to gain an approximation. Examples of applying forward model to line-pattern with different values of $K_2$ are presented in FIG. 6, which is an illustrative representation of line-pattern visualization for different values of $K_2$ in accordance with embodiments of the present invention. As illustrated, line-pattern image 600 has a value $K_2=1$, line-pattern image 610 has a value $K_2=6$, and line-pattern image has a value $K_2=11$. As may be seen, line-pattern image 600 with a value $K_2=1$ fits the curve features in the image the best. With the estimated coefficients of the forward model, the coefficients of the backward model, which is used to unwarp the distorted image are calculated. An example of corrected (or calibrated) distortion is provided in FIG. 4 which is an illustrative representation of IR thermography image 410 showing corrected (or calibrated) distortion 412 in accordance with embodiments of the present invention.

Figure 7:
FIG. 7 are illustrative representations of corrected IR thermography images for stitching in accordance with embodiments of the present invention.
Figure 7:
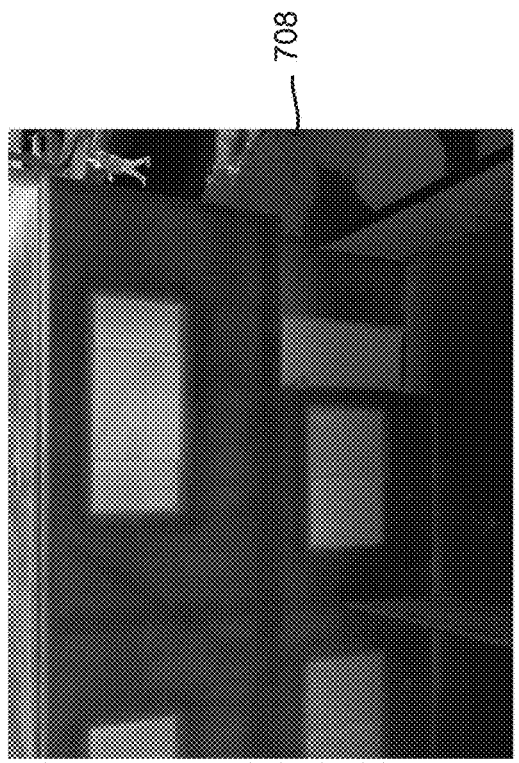
Figure 7:
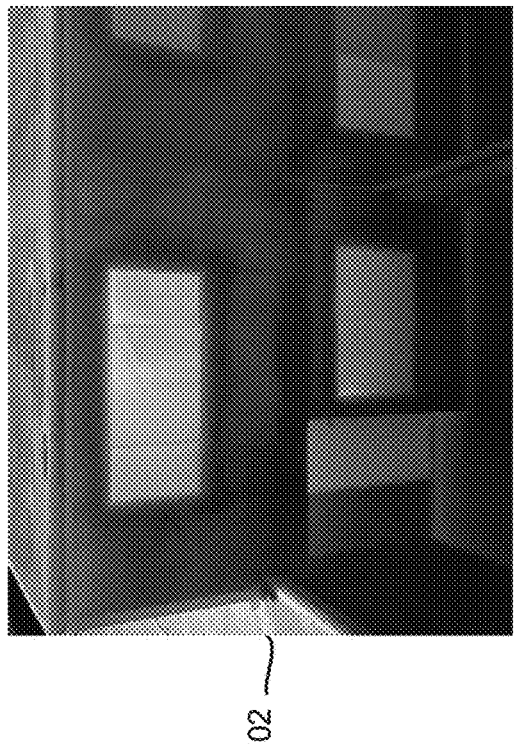
Figure 7:
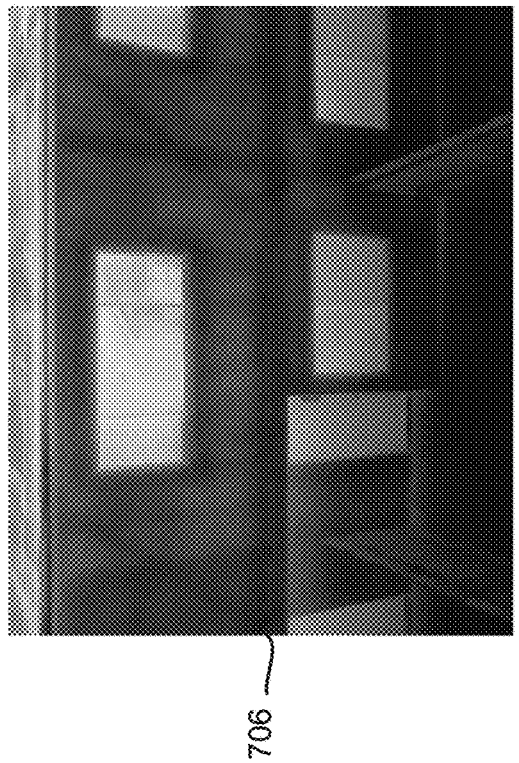

At a next step 210, the method stitches the selected IR thermography images corresponding with the selected façade together to form a single façade image corresponding with the selected façade. FIG. 7 are illustrative representations of corrected IR thermography images 702, 704, 706, and 708 for stitching in accordance with embodiments of the present invention. Projective transformations to stitch pairs of images together one at a time may be performed. To stitch two calibrated images together, the method first finds the homography matrix that defines the projective transformation between the two images. The homography matrix H is a 3×3 matrix with the form $$H = \begin{bmatrix} h_{11} & h_{12} & h_{13} \\ h_{21} & h_{22} & h_{23} \\ h_{31} & h_{32} & h_{33} \end{bmatrix}$$

and any point (x, y) can be projected from one image to the corresponding point (x', y') on the other image with the transformation defined by $$\begin{bmatrix} x'/\lambda \\ y'/\lambda \\ \lambda \end{bmatrix} = \begin{bmatrix} h_{11} & h_{12} & h_{13} \\ h_{21} & h_{22} & h_{23} \\ h_{31} & h_{32} & h_{33} \end{bmatrix} \cdot \begin{bmatrix} x \\ y \\ 1 \end{bmatrix}$$

The transformation parameters in H can be solved using the following equation, where ($x_n$, $y_n$) and ($x'_n$, $y'_n$) are the nth pair of corresponding points on the pair of images.

$$PH = \begin{bmatrix} -x_1 & -y_1 & -1 & 0 & 0 & 0 & x_1 x'_1 & y_1 x'_1 & x'_1 \\ 0 & 0 & 0 & -x_1 & -y_1 & -1 & x_1 y'_1 & y_1 y'_1 & y'_1 \\ -x_2 & -y_2 & -1 & 0 & 0 & 0 & x_2 x'_2 & y_2 x'_2 & x'_2 \\ 0 & 0 & 0 & -x_2 & -y_2 & -1 & x_2 y'_2 & y_2 y'_2 & y'_2 \\ -x_3 & -y_y & -1 & 0 & 0 & 0 & x_3 x'_3 & y_3 x'_3 & x'_3 \\ 0 & 0 & 0 & -x_3 & -y_3 & -1 & x_3 y'_3 & y_3 y'_3 & y'_3 \\ -x_4 & -y_4 & -1 & 0 & 0 & 0 & x_4 x'_4 & y_4 x'_4 & x'_4 \\ 0 & 0 & 0 & -x_4 & -y_4 & -1 & x_4 y'_4 & y_4 y'_4 & y'_4 \\ 0 & 0 & 0 & 0 & 0 & 0 & 0 & 0 & 1 \end{bmatrix} \cdot \begin{bmatrix} h1 \\ h2 \\ h3 \\ h4 \\ h5 \\ h6 \\ h7 \\ h8 \\ h9 \end{bmatrix} = \begin{bmatrix} 0 \\ 0 \\ 0 \\ 0 \\ 0 \\ 0 \\ 0 \\ 0 \\ 1 \end{bmatrix}$$

Figure 8:
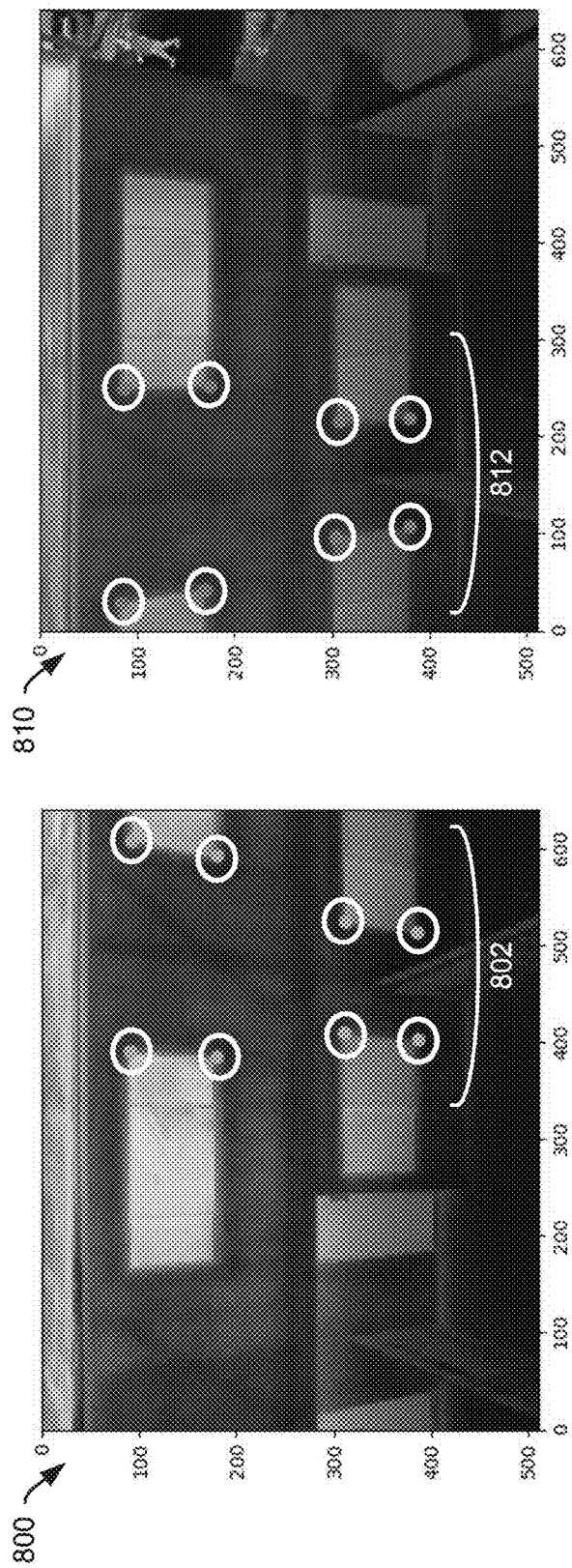
FIG. 8 are illustrative representations of corrected IR thermography images marked for stitching in accordance with embodiments of the present invention.
Figure 9:
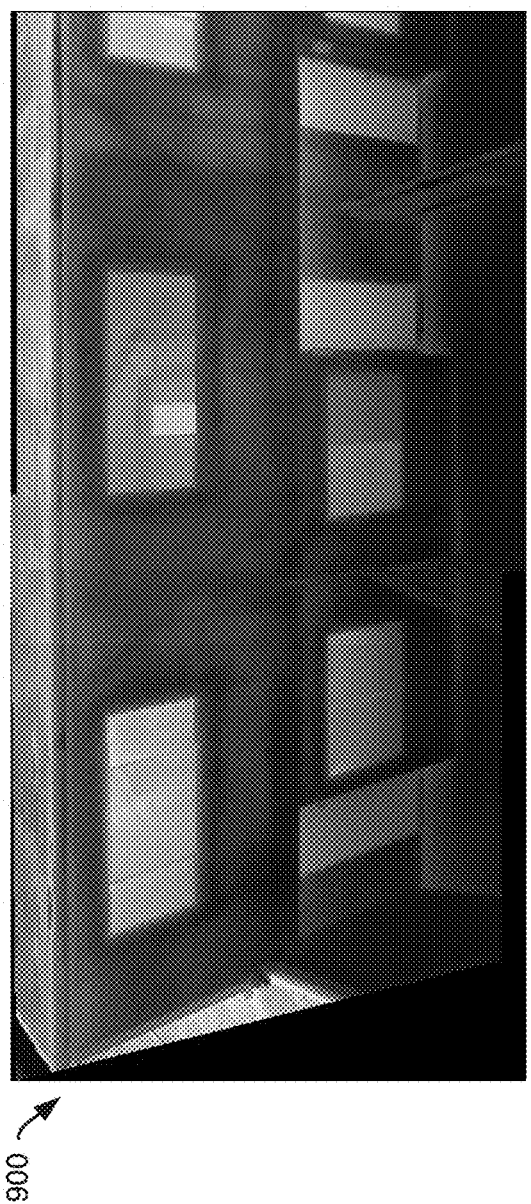
FIG. 9 is an illustrative representation of a stitched IR thermography image in accordance with embodiments of the present invention.
Figure 10:
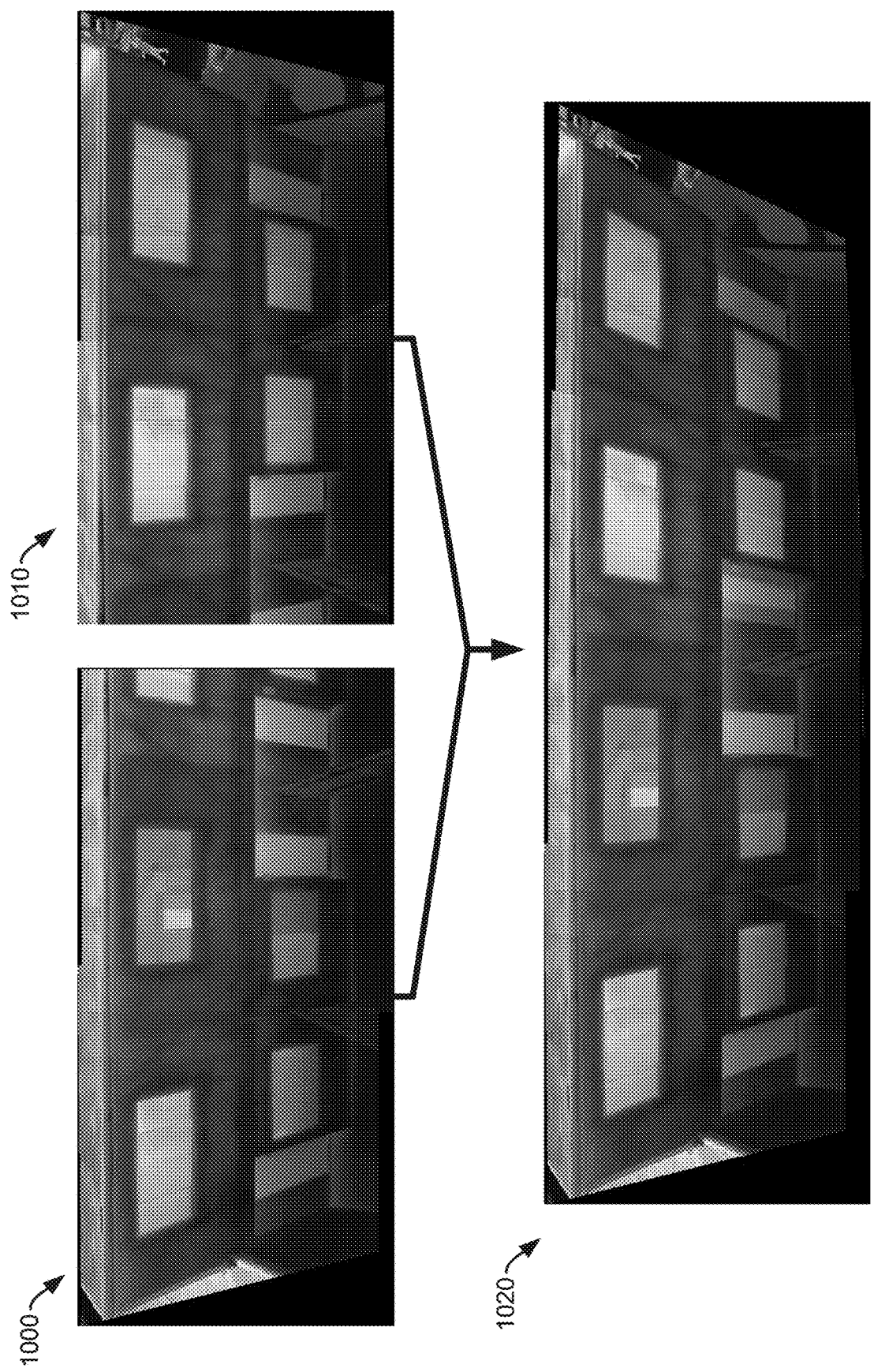
FIG. 10 is an illustrative representation of stitched IR thermography images in accordance with embodiments of the present invention.

Unlike the process of stitching high resolution RGB images where key-point detection can be applied and the transformation can be found automatically using algorithms like random sample consensus (RANSAC), thermal images have lower resolution compared to RGB images, and color-map visualization makes it difficult to extract meaningful key-points. Therefore, embodiments utilize a pipeline to let the user manually choose the correspondences between pair of images to be stitched together. For instance, if a user desires to stitch two images together as illustrated in FIG. 8 which are illustrative representations of corrected IR thermography images marked for stitching in accordance with embodiments of the present invention. As illustrated, pairs of corresponding points 802 and 812 are selected between images 800 and 810. Using the pixel coordinates of the corresponding points we selected, homography matrix H can be solved using least-square linear equation solver. Then we used the computed homography matrix to map pixels from one image onto the other image. A result of stitching using images 800 and 810 is shown in FIG. 9, which is an illustrative representation of stitched IR thermography image 900 in accordance with embodiments of the present invention. The process may be iterated to produce a fully stitched panorama shown in FIG. 10, which is an illustrative representation of stitched IR thermography images in accordance with embodiments of the present invention. As illustrated, stitched IR thermography image 1000 may be stitched with stitched IR thermography image 1010 to create stitched IR thermography image 1020, which is a composite of the images shown in FIG. 7.

Figure 11:
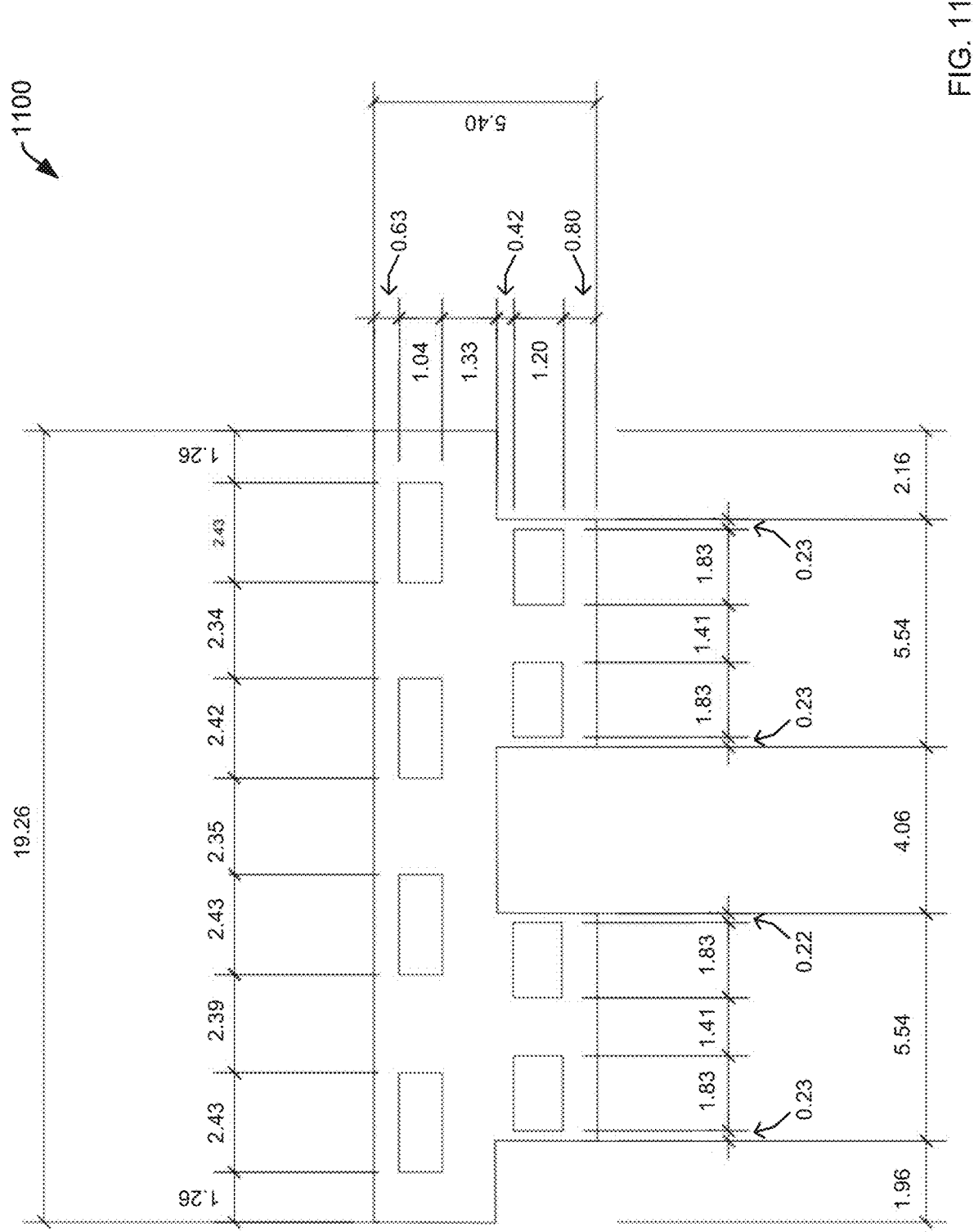
FIG. 11 is an illustrative representation of an example of actual dimensions of a building in accordance with embodiments of the present invention.

At a next step 212, the method corrects perspective distortion of the stitched (or single) façade image. Perspective distortion arises because images cannot often be captured head-on. Thus, ground-level photography may introduce low angle perspective distortion while aerial photography may introduce high angle perspective distortion. An example of high angle perspective distortion is illustrated by stitched IR thermography image 1020 shown in FIG. 10. In addition to removing perspective distortion, the resulting image should have the same aspect ratio as the actual facade. Given a pre-built 3D model of the building, the exact aspect ratio R according to the dimensions can be extracted, as shown in FIG. 11, which is an illustrative representation 1100 of an example of actual dimensions of a building (see also step 216).

A user may select the pixel coordinates of the two upper corners of the facade, $(x_l, y_l)$ and $(x_r, y_r)$. Using the aspect ratio R, the pixel coordinates of the two lower corners of the facade after perspective distortion correction can be computed as:

$$\left(x_l, y_l + \frac{x_r - x_l}{R}\right) \text{ and } \left(x_r, y_r + \frac{x_r - x_l}{R}\right) \qquad \text{Equation 2}$$

The relationship between facade panorama before and after perspective correction is again a perspective transformation, and the homography matrix can be computed using the equation:

$$PH = \begin{bmatrix} -x_1 & -y_1 & -1 & 0 & 0 & 0 & x_1 x_1' & y_1 x_1' & x_1' \\ 0 & 0 & 0 & -x_1 & -y_1 & -1 & x_1 y_1' & y_1 y_1' & y_1' \\ -x_2 & -y_2 & -1 & 0 & 0 & 0 & x_2 x_2' & y_2 x_2' & x_2' \\ 0 & 0 & 0 & -x_2 & -y_2 & -1 & x_2 y_2' & y_2 y_2' & y_2' \\ -x_3 & -y_y & -1 & 0 & 0 & 0 & x_3 x_3' & y_3 x_3' & x_3' \\ 0 & 0 & 0 & -x_3 & -y_3 & -1 & x_3 y_3' & y_3 y_3' & y_3' \\ -x_4 & -y_4 & -1 & 0 & 0 & 0 & x_4 x_4' & y_4 x_4' & x_4' \\ 0 & 0 & 0 & -x_4 & -y_4 & -1 & x_4 y_4' & y_4 y_4' & y_4' \\ 0 & 0 & 0 & 0 & 0 & 0 & 0 & 0 & 1 \end{bmatrix} \begin{bmatrix} h1 \\ h2 \\ h3 \\ h4 \\ h5 \\ h6 \\ h7 \\ h8 \\ h9 \end{bmatrix} = \begin{bmatrix} 0 \\ 0 \\ 0 \\ 0 \\ 0 \\ 0 \\ 0 \\ 0 \\ 1 \end{bmatrix}$$

Where, $(x_n, y_n)$ in this case is the pixel coordinate of the $n^{th}$ corner of the facade in the panorama prior to perspective correction, and $(x'_n, y'_n)$ is the pixel coordinate of the $n^{th}$ corner of the facade in the panorama after perspective correction.

The method then uses the computed homography matrix that represents the transformation of perspective correction to produce the head-on thermal facade panorama.

Figure 12:
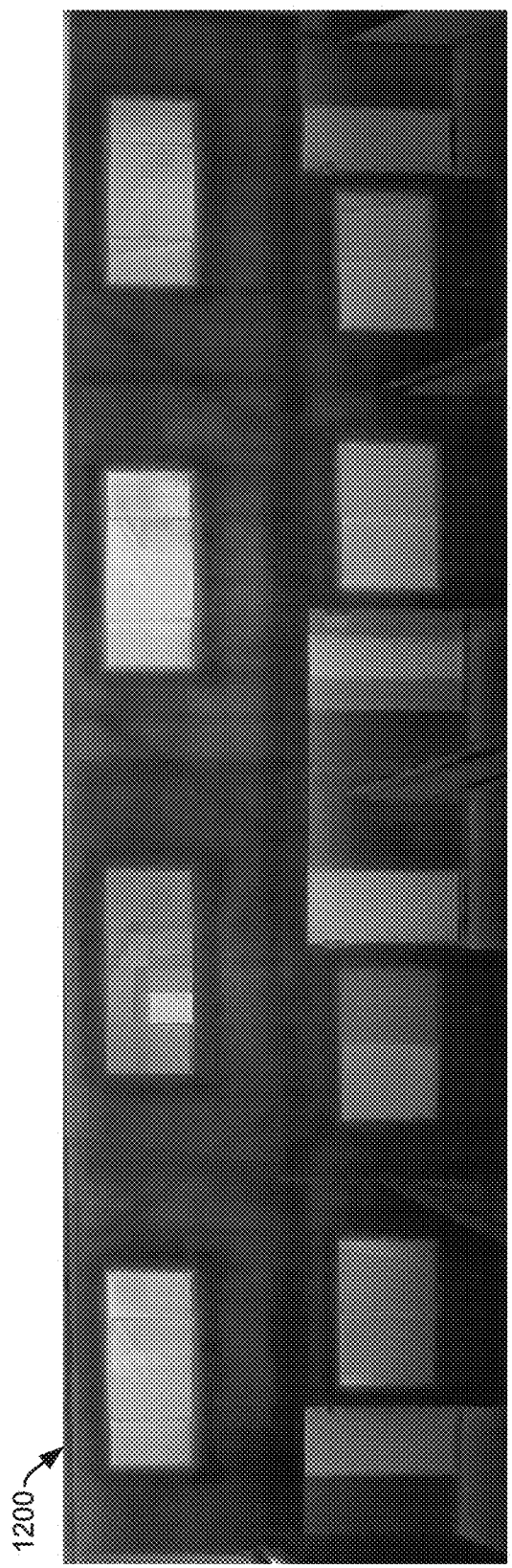
FIG. 12 is an illustrative representation of a corrected IR thermography image of a building façade in accordance with embodiments of the present invention.

At a next step 214, the method crops the single façade image to remove the surrounding redundant portions. In some embodiments, an RGB image corresponding with the façade may be utilized to provide guidance in cropping the single façade image. The result after perspective correction and cropping is shown in FIG. 12, which is an illustrative representation of a single corrected IR thermography image 1200 of a building façade in accordance with embodiments of the present invention. At a next step 216, the method receives dimensions of an actual façade corresponding with the single façade image generated by methods provided herein, whereupon the method ends. Actual dimensions as applied to the single façade image will provide for location of the building's internal framework disclosed below for FIG. 3. As may be appreciated, the steps disclosed may be iterated until all images corresponding with selected facades are completed.

Figure 13:
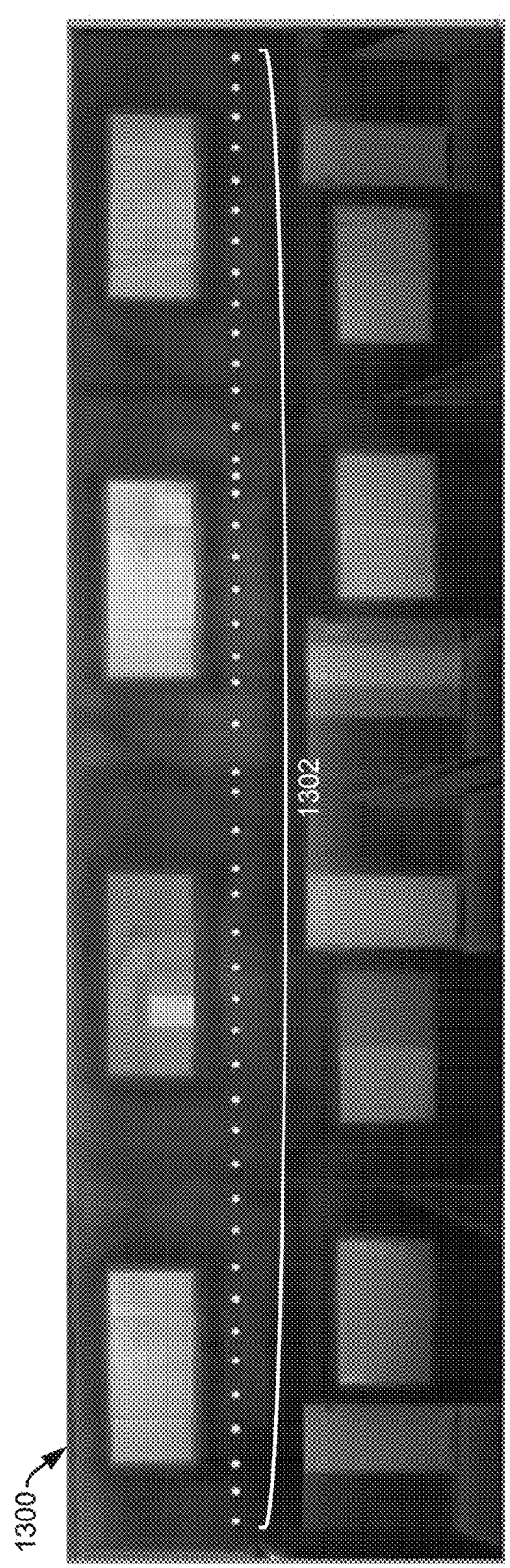
FIG. 13, which is an illustrative representation of identified building internal framework on an IR thermography image in accordance with embodiments of the present invention.

Returning to FIG. 3, FIG. 3 is an illustrative flowchart of methods for determining building internal framework in accordance with embodiments of the present invention. As illustrated, steps 302 to 306 further describe step 106 (see FIG. 1) above. As such, at a step 302, the method receives a single façade image such as illustrated for FIG. 12. At a next step 304, the method identifies the building's internal framework shown in the single façade image. As illustrated in FIG. 13, which is an illustrative representation of identified building internal framework 1302 on an IR thermography image 1300 in accordance with embodiments of the present invention. Currently, stud detection is done in the interior with a stud finder, which is then translated to the exterior, using landmarks such as corners of windows. As such, existing methods are tedious, laborious and error prone. Method and systems disclosed here provide a user interface in an architectural tool for selecting structures from corrected images. In some embodiments, the user identifies the framework by manually selecting a structure. Structures may be selected because of the differential heat signatures between the various building structures and components. In some embodiments, the framework is identified automatically. In embodiments, the building internal framework may include wood studs, wood beams, wood posts, metal studs, metal beams, metal posts, engineered studs, engineered beams, and engineered posts without limitation. At a next step 306, the method determines the building internal framework dimensions from the actual dimensions received from a step 216 (see FIG. 2) to determine the building internal framework dimensions. The method then ends.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for defining a building internal framework from external imagery, the method comprising:
   receiving a plurality of raw images of a building, wherein the plurality of raw images comprises a plurality of infrared (IR) thermography images;

processing the plurality of raw images of the building to establish a plurality of facades, wherein the processing the plurality of raw images comprises:

for each of the plurality of façades,
- selecting a façade;
- selecting all IR thermography images corresponding with the selected façade;
- removing barrel distortion from the selected IR thermography images;
- stitching the selected IR thermography images corresponding with the selected façade together to form a single façade image corresponding with the selected facade;
- correcting perspective distortion of the single facade image;
- cropping the single facade image to remove any surrounding redundant portions; and
- receiving dimensions of an actual facade corresponding with the single façade image; and determining the building internal framework for each of the plurality of facades.

2. The method of claim 1, wherein the plurality of raw images further comprises:
a plurality of red-green-blue (RGB) images.

3. The method of claim 2, wherein the determining the building internal framework for each of the plurality of facades comprises:
- receiving the single façade image;
- identifying the building internal framework shown in the single façade image; and
- determining the building internal framework dimensions shown in the single façade images.

4. The method of claim 1, wherein the cropping the single façade image further comprises:
cropping the single facade image in conformity with a corresponding RGB image of the actual façade.

5. The method of claim 1, wherein the stitching the selected IR thermography images comprises:
applying projective transformations to stitch pairs of the selected IR thermography images together one at a time.

6. The method of claim 1, wherein the building internal framework is selected from the group consisting of: wood studs, wood beams, wood posts, metal studs, metal beams, metal posts, engineered studs, engineered beams, and engineered posts.

7. The method of claim 1, wherein the external imagery is captured by aerial photographic equipment or ground level photographic equipment.

8. A system for defining a building internal framework from external imagery, the system comprising:
an image capture device for capturing a plurality of raw images of a building, wherein the plurality of raw images comprises a plurality of infrared (IR) thermography images;

a computing processor capable of processing the plurality of raw images of the building to establish a plurality of facades, wherein the processing the plurality of raw images comprises:

for each of the plurality of facades,
- selecting a façade;
- selecting all IR thermography images corresponding with the selected façade;
- removing barrel distortion from the selected IR thermography images;
- stitching the selected IR thermography images corresponding with the selected façade together to form a single facade image corresponding with the selected facade;
- correcting perspective distortion of the single facade image;
- cropping the single facade image to remove any surrounding redundant portions; and receiving dimensions of an actual facade corresponding with the single façade image; and a user interface for determining the building internal framework for each of the plurality of facades.

9. The system of claim 8, wherein the plurality of raw images further comprises:
a plurality of RGB images.

10. The system of claim 9, wherein the determining the building internal framework for each of the plurality of facades comprises:
- receiving the single façade image;
- identifying the building internal framework shown in the single façade image; and
- determining the building internal framework dimensions shown in the single façade images.

11. The system of claim 8, wherein the cropping the single façade image further comprises:
cropping the single facade image in conformity with a corresponding RGB image of the actual façade.

12. The system of claim 7, wherein the stitching the selected IR thermography images comprises:
applying projective transformations to stitch pairs of the selected IR thermography images together one at a time.

13. The system of claim 8, wherein the building internal framework is selected via the user interface from the group consisting of: wood studs, wood beams, wood posts, metal studs, metal beams, metal posts, engineered studs, engineered beams, and engineered posts.

14. The system of claim 8, wherein the external imagery is captured by aerial photography or ground level photography.

\* \* \* \* \*